United States Patent [19]

Carré et al.

[11] 4,020,278
[45] Apr. 26, 1977

[54] DATA CARRIER FOR OPTICAL READ-OUT

[75] Inventors: Bernard Carré; Claude Puech; Erich Spitz, all of Paris, France

[73] Assignee: Thomson-Brandt, Paris, France

[22] Filed: Oct. 16, 1975

[21] Appl. No.: 623,077

[30] Foreign Application Priority Data

Oct. 18, 1974 France .............................. 74.35148

[52] U.S. Cl. ........................ 358/128; 179/100.3 B; 235/61.12 N
[51] Int. Cl.² .................... G11B 7/24; H04N 5/76; G06K 19/06
[58] Field of Search ....... 178/6.6 R, 6.6 DD, 6.7 R, 178/6.7 A; 179/100.3 B, 100.3 V, 100.3 G, 100.3 K; 235/61.11 E, 61.12 N

[56] References Cited

UNITED STATES PATENTS

| | | | |
|---|---|---|---|
| 3,430,966 | 3/1969 | Gregg | 179/100.3 V |
| 3,855,426 | 12/1974 | Bouwhuis | 179/100.3 V |
| 3,919,465 | 11/1975 | Adler et al. | 178/6.6 R |
| 3,931,459 | 1/1976 | Korpel | 178/6.6 A |

*Primary Examiner*—Daryl W. Cook
*Attorney, Agent, or Firm*—Cushman, Darby & Cushman

[57] ABSTRACT

The present invention relates to data carriers intended for optical read out. The data carrier in accordance with the invention comprises: a first transparent material at the surface of which the information is recorded in the form of an embossed pattern; a partially transparent metal layer covers said embossed pattern and a second, thick transparent material is deposited upon the metal layer for protection purposes.

4 Claims, 1 Drawing Figure

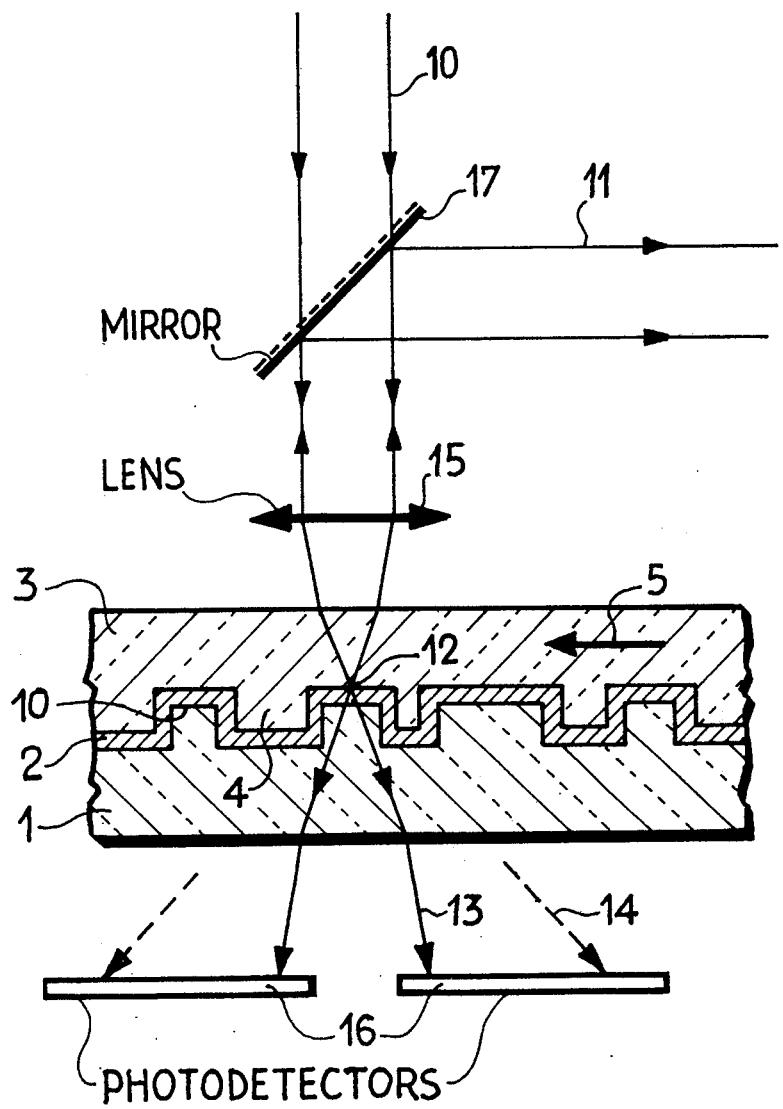

DATA CARRIER FOR OPTICAL READ-OUT

The present invention relates to the field of data carriers the read-out of which is performed optically; it relates more particularly to an improvement in the method of protecting the information recorded upon such a data carrier.

The protection of data carriers containing recordings is a problem of especial importance in the case where the information concerned is video information. In other words, this kind of information, generally speaking, is carried by a disc and takes the form of engraved of relief recordings of very small dimensions, around one micron, rendering them particularly vulnerable to external influences such as dust, scratching, fingerprints etcetera. Moreover, read-out of the information by the use of light beams, requires that the surface of the disc be cleaned, and this is also a contributory factor in bringing about the deterioration of the recording.

Various methods of protecting data carriers have already been proposed, amongst which one can point in particular to the application of a protective layer, of sufficient thickness, made of a transparent material, to the whole of the surface of the disc carrying information, the refractive index of this protective layer then having to differ from that of the carrier. A first restriction on the utilisation of this kind of carrier is that it can only be read out by transmission (of light) and not by reflection, so that a whole category of optical read units is eliminated from consideration. A second restriction arises from the fact that the protective material must have a different refractive index from the carrier, this modifying the trajectory of the light rays and therefore requiring adaptation of the reader unit used.

The object of the present invention is a data carrier which makes it possible to optically read out the information either by transmission or by reflection, whilst at the same time protecting the recording.

In accordance with the present invention, there is provided a data carrier for optical read-out with a predetermined radiation, said data carrier comprising: a substrate transparent to said radiation, an embossed pattern representative of said data provided at the surface of said substrate, a thin metal layer deposited upon said embossed pattern and a protective layer transparent to said radiation overlaying said metal layer; the thickness of said thin metal layer being selected for partially reflecting said radiation.

For a better understanding of the present invention and to show how the same may be carried into effect reference will be made to the ensuing description and the attached FIGURE in which a schematic illustration of the section through the data carrier in accordance with the invention has been given, the true dimensions of the carrier not having been adhered to, simply in order to make the drawing clearer.

In this figure, there can be seen:
a first transparent material forming a substrate 1;
a thin metal layer 2;
and a second transparent material forming a protective layer 3.

Also illustrated are light beams (10, 11, 13) and optical components (15, 16, 17).

The material 1 for example takes the form of a disc at one of the faces of which the information is recorded along a spiral track in the form of an embossed pattern.

In the example shown in the figure a section is taken at rightangles to the track and over a fraction thereof; the direction of transfer of the track has been indicated by an arrow 5. The embossed pattern is constituted by the depressions 4 formed in the face 10 of the material 1, these depressions 4 having equal width and depth, their spacing and their length representing the coded information.

The metal layer 2 is extremely thin, for example of the order of one hundreth of the depth of the depressions 4, and covers the material 1 at least opposite the track or, more simply, covers the whole of the surface 10. It may be produced for example by vaporisation under vacuum or by cathode sputtering. The layer 2 is designed to reflect a fraction of the incident read-out light beam in order to enable read-out to take place not only by transmission across the data carrier but also by reflection at the layer 2. By way of example, a metal layer of gold or silver, the thickness of which is in the order of 30 A units, makes it possible to achieve equal diffractive energies in both reflection and transmission modes.

The second transparent material 3 covers the metal layer 2 either without penetrating into the depressions 4, or, in a preferred embodiment, in such a way that it does penetrate into said depressions 4. This layer can be formed for example by the method known as draw coating, that is to say that the material 1, after metallisation 2, is dipped in a collodion solution dissolved in ether. Coating is effected by drawing the disc out of the solution at a constant rate for example. The layer 3 is designed to protect the embossed pattern carrying the information. It can be constituted either by the same material as the layer 1 or by a different material; in the latter case, it should be noted that the refractive index will be different and the trajectory of the read-out light beam will be modified.

By way of example, in the figure optical read-out means having been illustrated, comprising a parallel incident light beam 10 and a splitter element 17 passing the incident beam towards an objective lens 15; the purpose of the objective lens 15 is to focus the read-out beam upon the surface carrying the information. In the absence of any depressions 4, the incident beam is transmitted along a trajectory marked 13, to photodetector means schematically indicated by two photoelectric cells 16.

In the presence of an impression 4, the incident beam is diffracted along a trajectory 14 indicated in broken line fashion. When read-out is performed in a similar fashion but by reflection, the returning beam 11 is separated from the incident beam by the splitter 17 which directs the beam 11 on to photodetector means which have not been shown.

What we claim is:
1. A data carrier for optical read-out with a predetermined radiation, said data carrier comprising: a substrate transparent to said radiation, an embossed pattern representative of said data provided at the surface of said substrate, a thin metal layer deposited upon said embossed pattern and a protective layer transparent to said radiation overlaying said metal layer; the thickness of said thin metal layer being selected for partially reflecting said radiation; said thin metal layer being deposited over the whole of said surface.

2. A data carrier as claimed in claim 1, wherein said substrate and said protective layer are made of materials having the same refractive index.

3. A data carrier as claimed in claim 1, wherein said thickness is substantially smaller than the depth of said embossed pattern.

4. A data carrier as claimed in claim 1, wherein the amounts of said radiation respectively reflected and transmitted by said thin metal layer are substantially equal.

* * * * *